(12) United States Patent
Lilienthal

(10) Patent No.: US 6,817,494 B2
(45) Date of Patent: Nov. 16, 2004

(54) VALVE ASSEMBLY FOR PRESSURIZED FLUID CONTAINERS

(75) Inventor: Hans Peter Lilienthal, Hamburg (DE)

(73) Assignee: Aerosol-Technik Lindal GmbH (DE)

( * ) Notice: Subject to any disclaimer, the term of this patent is extended or adjusted under 35 U.S.C. 154(b) by 113 days.

(21) Appl. No.: 10/259,119

(22) Filed: Sep. 27, 2002

(65) Prior Publication Data

US 2003/0071081 A1 Apr. 17, 2003

(30) Foreign Application Priority Data

Oct. 5, 2001 (DE) .................................... 201 16 336 U

(51) Int. Cl.[7] .............................................. B65D 83/00
(52) U.S. Cl. ................................................. 222/402.24
(58) Field of Search ........................ 222/402.1, 402.13, 222/402.15, 402.16, 402.24

(56) References Cited

U.S. PATENT DOCUMENTS

| | | | | |
|---|---|---|---|---|
| 3,117,700 A | * | 1/1964 | Gorman | 222/402.2 |
| 3,416,770 A | * | 12/1968 | Green | 251/303 |
| 3,482,784 A | * | 12/1969 | Webster | 239/493 |
| 3,785,536 A | * | 1/1974 | Graham | 222/402.21 |
| 3,825,159 A | * | 7/1974 | Laauwe | 222/402.24 |
| 3,862,741 A | * | 1/1975 | Steiman et al. | 251/353 |
| 4,471,893 A | * | 9/1984 | Knickerbocker | 222/402.22 |
| 5,014,887 A | * | 5/1991 | Kopp | 222/402.1 |
| 5,439,148 A | * | 8/1995 | Driessen | 222/402.1 |
| 6,039,306 A | * | 3/2000 | Pericard et al. | 251/353 |

FOREIGN PATENT DOCUMENTS

DE  197 10 541 A1  3/1997

* cited by examiner

Primary Examiner—Gene Mancene
Assistant Examiner—Patrick Buechner
(74) Attorney, Agent, or Firm—Wall Marjama & Bilinski LLP

(57) ABSTRACT

A valve assembly for fluid container under pressure, comprising a valve cup sealingly attachable to an opening of the container, the valve cup having an opening, a valve body of plastic material attached within the cup opening and having a through going axial passage and a sealing surface, a valve piston of plastic material guided within the passage, co-acting with the sealing surface and having a lower portion, spring means co-acting with a valve body which presses the valve piston against the sealing surface, characterized in that a cap is connected to the valve body designed to allow flow or fluid from the exterior of the cap to the interior thereof, a preferably axial projection being formed to the bottom facing upwardly towards the valve body, the bottom projection telescopically co-acting with the lower portion of the valve piston, the lower portion and/or the bottom projection having a spring portion adapted to generate a spring force by which the piston is pressed against the sealing surface.

9 Claims, 2 Drawing Sheets

VALVE ASSEMBLY FOR PRESSURIZED FLUID CONTAINERS

FIELD OF THE INVENTION

The invention refers to a valve assembly for a fluid container under pressure.

BACKGROUND OF THE INVENTION

Valve assemblies for fluid containers under pressure, e.g. aerosols spray packs or the like are known with various modifications. In case of low viscous substances to be sprayed relatively small passages or channels in the valve arrangement are sufficient that the substance under pressure can be conveyed to a spray head so that it can be dispensed in form of a spray mist. However, it is also known to dispense higher viscous substances through such containers, e.g. gels or foams. For such applications the flow area in the valve must be larger.

Valve assemblies for fluid containers use spring-actuated valve pistons or closing members and so-called tilting valves. The invention refers to spring-actuated valves.

It is known to position a coil spring between the valve piston and the valve body which presses the valve piston against a sealing surface or a valve seat. From DE 197 10 541 a valve assembly has become known wherein a leaf spring presses the valve piston against a sealing seat. The leaf spring or spring tongue is a portion of a clip which is snapped onto the valve body. The valve body consists of plastic material while the clip is made of spring metal.

SUMMARY OF THE INVENTION

It is the object of the invention to provide a valve assembly for fluid containers under pressure which can be completely manufactured of inexpensive plastic parts.

This object is achieved by the features of claim 1.

In the valve assembly according to the invention a fluid permeable cap of plastic material is attached to the valve body. An upwardly facing portion of the bottom of the cap and a lower portion of the piston co-act telescopically and are formed such that due to an elastic deformation of at least one spring portion of the bottom portion and/or the lower piston portion a spring force is generated by which the valve piston is pressed against the sealing surface.

In the invention either the lower portion of the valve piston or a portion of the bottom portion of the cap is formed resilient so that a movement of the portions towards each other is only possible by overcoming the spring force, which can be used as restoring force for the valve piston. This design has the further advantage that a guidance for the valve piston is formed between the telescopically co-acting portions at least if they cooperate axially. The valve piston is guided in the axial passage of the valve body, however, between these parts a sufficient tolerance is to be provided so that the valve body may freely move. This on the other side means that the valve piston can be slightly tilted which may aggravate the actuation of the valve. The design of the valve spring according to the invention takes care for a sufficient axial guidance so that a tilting can be substantially avoided.

According to an embodiment of the invention an annular sealing lip facing downwardly is formed to the valve body having a conical inner wall which co-acts with the valve piston. A cylindrical portion of the piston co-acts with the conical wall of the sealing lip. A certain tension can be established between the sealing lip and the cylindrical piston portion which increases the sealing effect in this area.

According to a further embodiment of the invention the bottom portion is formed as conical or convex or spherical projection which engages the space formed by the finger-shaped spring portions which are formed to the valve piston in circumferentially spaced arrangement on a circle. Preferably, four of such spring portions are provided. The inner ends of the finger-shaped spring portions slide along the conical or convex or spherical surface of the projection when the valve piston is actuated. Thereby a restoring force towards a sealing surface for the valve piston is generated. This restoring force is enhanced by the pressure in the fluid container. The described effect of the restoring spring must be only sufficient to bring the cylindrical piston portion in engagement with the sealing surface or the inner wall of the sealing lip, respectively. Thereafter, the closing force is substantially contributed by the inner pressure of the fluid container.

According to a further embodiment of the invention the cap has an annular portion including an inner annular bead which snappingly engages the radial portion of the valve body. The lower end of the valve body can engage a radial flange portion of the annular portion in order to secure the cap on the valve body axially and radially. The bottom of the cap is preferably connected to the flange portion through spaced segments. Between the segments sufficient flow passages are provided for the substance to be dispensed. The segments may be disposed on the outer surface of a cone since the bottom of the cap must have only a diameter that allows the formation of the projection and the free movement of the spring portion of the piston relative to the cap.

The valve cup by which the valve assembly is fastened in the opening of the fluid container has an inner opening into which the valve assembly or the valve body, respectively, is inserted. According to an embodiment of the invention the valve cup has an upwardly bent annular portion which sealingly co-acts with an annular groove in the outer side of the valve body. Preferably, the groove has a toothing in order to improve the retaining of the valve body and the sealing effect. Furthermore, the wall of the groove where the bent of the axial flange portion is located can have a bevel or a rounded portion.

BRIEF DESCRIPTION OF THE DRAWINGS

An embodiment example of the invention is subsequently described along accompanying drawings.

DETAILED DESCRIPTION OF THE INVENTION

Figure 1:
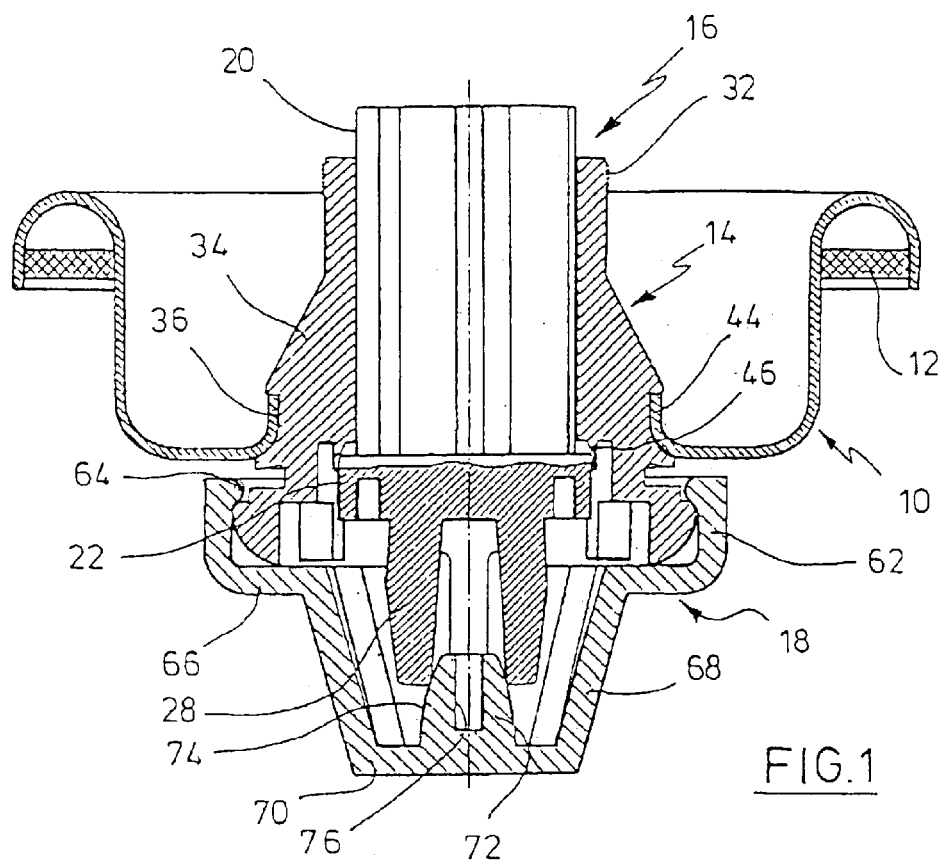
FIG. 1 shows a cross section of a valve assembly according to the invention.
Figure 2:
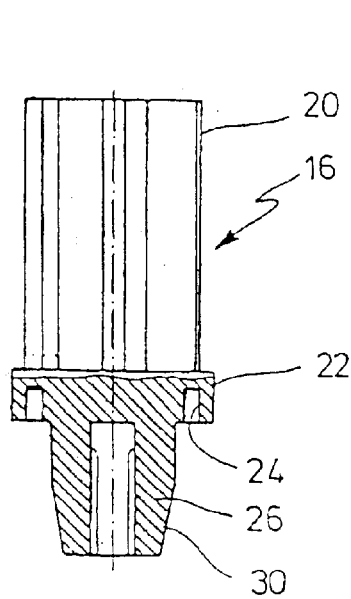
FIG. 2 shows a cross section partially a side view of a valve piston of the valve assembly of FIG. 1.

The valve assembly for a fluid container shown in FIG. 1 includes a valve cup 10 for the attachment to a fluid container not shown through a sealing ring 12. In an opening of the valve cup 10 a valve body 14 of plastic material is located. The sleeve-shaped valve body 14 accommodates a valve piston 16. A cap 18 is attached to valve body 14 below valve cup 10. Subsequently the individual parts of the valve assembly of FIG. 1 are explained.

Figure 3:
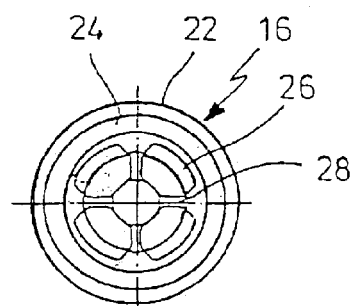
FIG. 3 shows the bottom view of the valve piston of FIG. 2.
Figure 4:
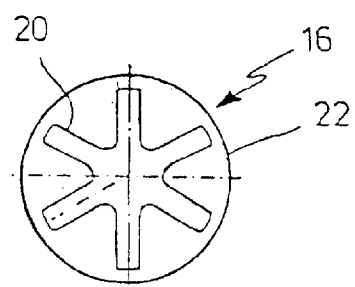
FIG. 4 shows the plan view of the valve piston of FIG. 2.
Figure 5:
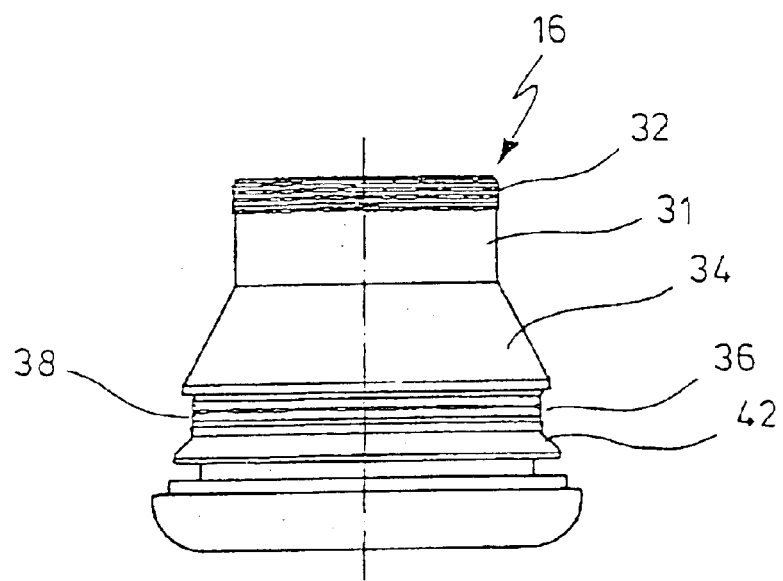
FIG. 5 shows the lateral view of a valve body of the valve assembly of FIG. 1.

The valve piston 16 has a shaft 10 which is star-shaped in a cross section as can be seen in FIG. 4. The shaft has relatively small tolerances with respect to the passage in valve body 14. Below shaft 20 a slightly larger cylindrical piston portion 22 is provided which has an annular groove 24 at the lower end. Four finger-shaped spring portions 26 are formed to piston portion 22, the contour thereof can be seen in FIG. 3. On the side of the spring portions 26 facing each other the spring portions 26 are limited by straight surfaces which together form a straight rectangular passage in cross section. Slots 28 are between the spring portions. The spring portions 26 are tapered towards their lower ends and have a corresponding bevel 30.

Figure 6:
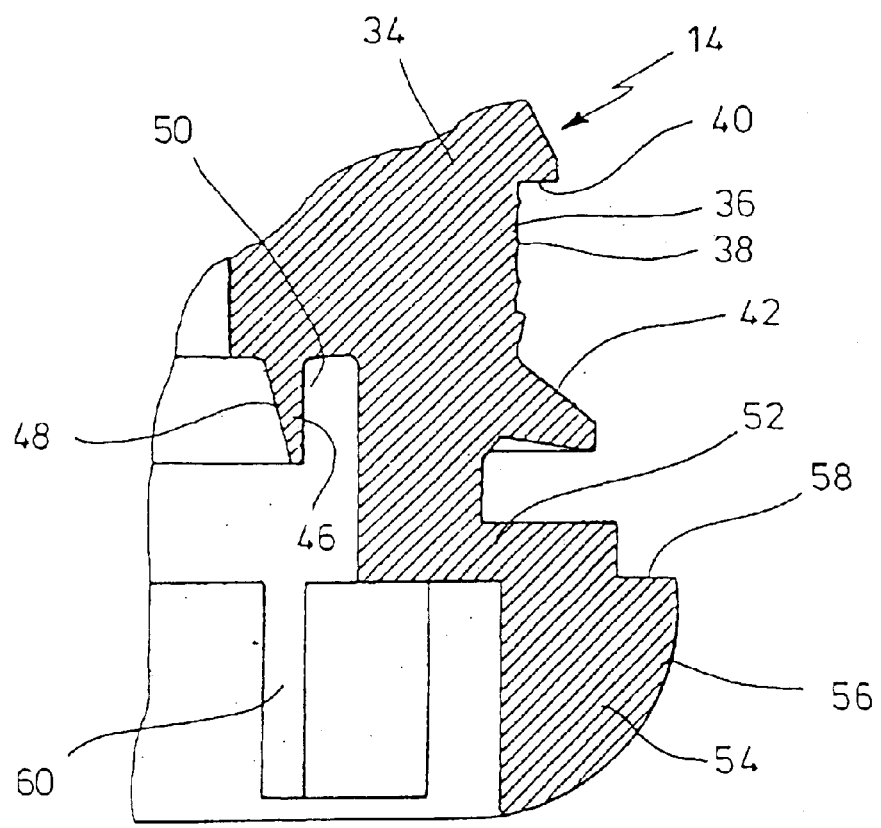
FIG. 6 shows a cross section of a part of the valve body of FIG. 5.

At the upper end the valve body 14 has a kind of toothing 32 by which a sealing is achieved through a plugged tubular portion, e.g. a corresponding dispensing head (not shown). Below the shown portion 32 which is formed to a cylindrical portion a conical portion 34 is provided into which an annular groove 36 is formed. As can be seen in FIGS. 6 and also 5 the bottom of the annular groove 36 is provided with a slight toothing 38. While the upper groove wall 40 extends radially the lower groove wall 42 is beveled and has a rounded transition to groove bottom 36. As can be seen in FIG. 1 an axially bent inner portion 44 of valve cup 10 is clampingly accommodated by annular groove 36. Through the described design of the annular groove 36 a sealing and safe cooperation is achieved between portion 44 and annular groove 36.

An annular axially extending sealing lip 46 is formed below the passage through the valve body 14. The sealing lip 46 has a conical inner wall 48 as can be seen in particular in FIG. 6. An axially extending annular groove 50 is formed adjacent to sealing lip 36.

As can be also seen in FIG. 1 the annular cylindrical piston portion 22 is within the sealing lip 46, with the edge of the piston portion 22 sealingly co-acting with wall 48.

An annular portion 54 is formed to the valve body 14 through a radial web portion 52 of valve body 14. The annular portion has an outer rounded contour 56. The web portion 52 joins to annular portion 54 through a step 58. At the inner side the annular portion 54 has a plurality of radial rips 60 which are circumferentially equally spaced.

The cap 18 has an annular portion 62 which at the upper side has annular bead 64. Upon assembly cap 18 is pressed against valve body 14 from below. The annular bead 64 has a rounded outer contour in cross section and slides over the rounded portion 56 of annular portion 54. The latter is bent slightly downwardly and radially inwardly so that the bead may move up to step 58 until it snaps behind step 58 in order to secure cap 18 effectively on the valve body. The lower end of the valve body engages a radially extending flange portion 66 so that the cap 18 is retained at valve body 14 radially and axially as well.

A plurality of segments 68 are formed to flange portion 66 which are spaced and extend towards each other and somewhat downwardly. They are connected to a bottom 70. An axial projection 72 is formed on the inner side of bottom 70 which has a convex outer contour 74. A blind bore 76 is formed in the projection 42 from above.

During the already described mounting of cap 18 on valve body 14 the projection 72 moves into the inner space between the spring portions 78 which are then bent elastically radially outwardly. Thereby an upwardly effecting spring force is exerted on valve piston 16, and the piston portion 72 is brought into sealing engagement with the inner wall 48 of sealing lip 46. If valve piston 16 is pressed downwardly the spring portions are spreaded radially outwardly and increase the spring force so that a sufficient restoring force is established which can move the valve piston 16 back if the downwardly effecting force on the valve piston is terminated.

What is claimed is:

1. A valve assembly for fluid container under pressure, comprising a valve cup sealingly attachable to an opening of the container, the valve cup having an opening, a valve body of plastic material attached within the cup opening and having a through going axial passage and a sealing surface, a valve piston of plastic material guided within the passage, co-acting with the sealing surface and having a lower portion, a cap connected to the valve body designed to allow flow or fluid from the exterior of the cap to the interior thereof, the can having a bottom portion, a preferably axial bottom projection being formed to the bottom portion upwardly towards the valve body, the bottom projection telescopically co-acting with the lower portion of the valve piston, the lower portion of the valve body having finger-shaved spring portions and the bottom projection engaging the space between said finger-shaped spring portions, wherein upon actuation inner ends of the finger-shaped spring portions slide along an outer surface of the bottom projection to generate a spring force by which the piston is pressed against the sealing surface.

2. The valve assembly of claim 1, wherein a downwardly facing annular sealing lip is formed on the valve body, the inner wall of the sealing lip being conically-shaped, and the piston having a cylindrical piston portion which is located within the sealing lip and co-acts sealingly with the conical wall.

3. The valve assembly of claim 1, wherein the spring portions are circumferentially spaced on a circle and are formed to the valve body.

4. The valve assembly of claim 3, wherein four spring portions are provided.

5. The valve assembly of claims 1, wherein the cap has an annular portion which snappingly grips behind a radial portion of the valve body through an inner annular bead, whereby the lower end of the valve body engages a radial flange portion of the annular portion in order to secure the cap on the valve body axially and radially as well and the bottom of the cap is connected to the flange portion through spaced segments.

6. The valve assembly of claim 1, wherein an axially bent cup portion which limits the inner opening of a valve cup clampingly engages an annular groove of the valve body.

7. The valve assembly of claim 6, wherein the lower wall of the annular groove is arcuately or obliquely shaped in cross section for the adaptation to the curvature of the valve cup in this area.

8. The valve assembly of claim 7, wherein the bottom of the annular groove has a toothing running around the groove.

9. The valve assembly of claim 5, wherein the radial portion is formed to the valve body such that it is deformed downwardly if the annular portion of the cap is snappingly mounted.

* * * * *

UNITED STATES PATENT AND TRADEMARK OFFICE
CERTIFICATE OF CORRECTION

PATENT NO. : 6,817,494 B2 Page 1 of 1
DATED : November 16, 2004
INVENTOR(S) : Hans Peter Lilienthal It is certified that error appears in the above-identified patent and that said Letters Patent is hereby corrected as shown below:

Column 4,
Line 26, the word "shaved" is incorrect please replace with the word -- shaped --.

Signed and Sealed this

Fifteenth Day of February, 2005

JON W. DUDAS
*Director of the United States Patent and Trademark Office*